US006980297B2

(12) United States Patent
Maeda

(10) Patent No.: US 6,980,297 B2
(45) Date of Patent: Dec. 27, 2005

(54) WAVELENGTH MONITOR

(75) Inventor: Minoru Maeda, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 92 days.

(21) Appl. No.: 10/051,507

(22) Filed: Jan. 17, 2002

(65) Prior Publication Data

US 2002/0093660 A1 Jul. 18, 2002

(30) Foreign Application Priority Data

Jan. 17, 2001 (JP) .................................... P. 2001-008589

(51) Int. Cl.[7] .................................................. G01B 9/02
(52) U.S. Cl. ....................................................... 356/450
(58) Field of Search .................................. 356/450, 518

(56) References Cited

U.S. PATENT DOCUMENTS 4,280,764 A * 7/1981 Sica et al. ................. 356/35.5
4,758,090 A 7/1988 Schuma
4,832,492 A * 5/1989 Calvani et al. ............. 356/484
5,574,557 A * 11/1996 Bjork et al. ................ 356/450
5,684,545 A * 11/1997 Dou et al. ..................... 349/1
5,841,536 A 11/1998 Dimmick
6,043,883 A 3/2000 Leckel et al.
6,137,573 A * 10/2000 Luke et al. ................. 356/453
6,587,214 B1 7/2003 Munks
6,621,837 B2 9/2003 Le Gall et al.
6,795,188 B2 9/2004 Ruck et al.

* cited by examiner

*Primary Examiner*—Samuel A. Turner
*Assistant Examiner*—Michael A. Lyons
(74) *Attorney, Agent, or Firm*—Fish & Richardson P.C.

(57) ABSTRACT

A wavelength monitor 10 having a Michelson interferometer (or Mach-Zehnder) optical system 11 of a spatial light type having optical input from a light source has an interference pattern generating means 12 which inclines the wavefronts of interfering beams of collimated light to generate an interference pattern in the light intensity distribution in an interference light beam planes a first slit 107 and a second slit 108 which are adjustable in position and provided in front of a first photo-detector 109 and a second photo-detector, respectively, which receive split beams of interference light, and a signal processing means 111 by which the changes in the intensity of light from the first photo-detector 109 and the second photo-detector 110 are counted and subjected to necessary arithmetic operations to output signals representing wavelength data for the input light.

34 Claims, 6 Drawing Sheets

WAVELENGTH MONITOR

BACKGROUND OF THE INVENTION

1. Field of the Invention

The present invention relates to wavelength monitors, which are typically used in the field of optical measurement technology to measure the wavelengths of light sources oscillating in a single mode.

2. Description of the Related Art

Light sources for single-mode oscillating DFB-LD (distributed feedback laser diode) and DBR-LD (distributed Bragg reflector laser diode) have a problem of experiencing drifts as they are used for a prolonged period of time, so in a DWDM (dense wavelength division multiplexing) system, the wavelengths of such light sources must be controlled by measuring them at appropriate times.

Wavelength tunable light sources of an external resonator type using a diffraction grating are extensively used to measure the wavelength characteristics of optical components. While they are capable of setting a desired value of wavelength over a broad range (≧100 nm), this type of light sources are sensitive to external effects and temperature changes in particular affect the wavelength stability. In addition, as the DWDM system becomes adaptive to higher degrees of multiplexing, it is required to increase the probability that the light source has stable wavelengths.

Among the conventional devices for measuring the wavelengths of light sources, the most commonly used are spectroscopes such as an optical spectrum analyzer that rotate a diffraction grating by a moving mechanism.

However, the moving mechanism in such spectroscopes makes them bulky and poses other problems such as limited long-term reliability. To deal with these difficulties, various types of wavelength monitor have been developed that measure the wavelengths of light sources at appropriate times with a compact design having no moving mechanism.

Among these wavelength monitors, one called a wavelength locker is used to control the wavelength of a DFB-LD light source with a structure that uses optical components such as interference film based filters and diffraction gratings.

The wavelength monitor called a wavelength locker can only be operated over a narrow wavelength range but using no mechanical moving parts, it has high reliability, can be reduced in size, requires no large-scale processing with software and, hence, is suited to the purpose of controlling the wavelengths of light sources such as one for DBF-LD that seldom vary in wavelength. There is, however, a problem in that the operating wavelength is limited by the wavelength characteristics of the components used such as filters.

A conventional wavelength monitor that is free from this problem may be a "wavelength change measuring apparatus" disclosed in JP 11-034697 A. A block diagram for the configuration of this apparatus is shown in FIG. 6 as a reference for the following description of the apparatus.

As shown in FIG. 6, the "wavelength change measuring apparatus" under consideration is basically composed of an input fiber 201, a collimating lens 202, a beam splitter 203 as a first splitting means, a first reflector 204, a second reflector 205 with a step of $d=\lambda_0/8$, a reflecting prism 206 as a second splitting means, a first photo-detector 207, a second photo-detector 208, and a signal processing circuit 209 for processing signals from the two photo-detectors.

Measuring light emerging from the input fiber 201 is collimated and launched into the beam splitter 203 as the first splitting means provided on the axis of the emerging light, whereby it is split into two beams, one directed toward the first reflector 204 and the other toward the second reflector 205. The first reflector 204 and the second reflector 205 are provided normal to the optical paths of the split beams of collimated light emerging from the beam splitter 203 and their optical axes are adjusted such that each of the split beams of collimated light will be reflected back to the beam splitter 203 by travelling through the same optical path.

The second reflector 205 is a plane reflector having a step of $d=\lambda_0/8$, so when a light beam is reflected by the second reflector 205 and travels through the return path, one half of the beam plane generates a difference of $\lambda_0/4$ in pathlength ($\lambda_0$ is the center wavelength in the measurable wavelength range and may take the value of 1550 nm).

The two beams of collimated light that have been reflected by the first reflector 204 and the second reflector 205 make a second entry into the beam splitter 203, where they are recombined before entering the reflecting prism 206 as the second splitting means, The reflecting prism 206 is provided such that the axial plane where the pathlength difference of $\lambda_0/4$ has been generated coincides with the edge tip surface of the reflecting prism 206; the recombined parallel light incident on the reflecting prism 206 is split into two beams by its edge tip surface and the split beams are launched into the first photo-detector 207 and the second photo-detector 208 which are provided on their optical axes. The light beams entering the two photo-detectors are output to the signal processing circuit 209 as currents that depend on their optical intensity. The signal processing circuit 209 compares the light intensities from the two photo-detectors and perform necessary arithmetic operations to output wavelength data.

The changes in light intensity vs. wavelength that are obtained with the ordinary Michelson interferometer are expressed by the following eq. 1. A normalized Gaussian distribution in a light beam plane gives a uniform light intensity, which varies uniformly with changing wavelength.

$$I=[1+\cos[4\pi*\Delta L/\lambda]]/2 \tag{1}$$

In eq. 1, I signifies the normalized light intensity received by a photo-detector; $\lambda$ is the wavelength of the light input from the light source; $\Delta L$ is the pathlength difference in the Michelson interferometer.

In the design described above, a plane reflector having a step of $d=\lambda_0/8$ is used as the second reflector 205, so when a light beam is reflected by the second reflector 205 and travels through the return path, one half of the beam plane generates a pathlength difference of $\lambda_0/4$, thereby producing periodic interference light intensity signals with a phase difference of $\pi/2$.

Using the interference light intensity signals with a phase difference of $\pi/2$, one can determine the amounts and directions of changes in the wavelength of a light source.

However, the above-described conventional wavelength monitor, or the "wavelength change measuring apparatus" disclosed in JP 11-034697 A, does not satisfy the low-cost requirement since a step mirror, or a mirror specially designed to have a step of $d=\lambda_0/8$, must be used.

As a further problem, diffraction occurs at the boundary between the step and the non-step area of the step mirror, producing distorted interference light signals.

SUMMARY OF THE INVENTION

The present invention has been accomplished to solve the aforementioned problems of the conventional and its principal object is to provide a low-cost wavelength monitor for measuring the wavelength of a single mode oscillating light source with such a design that a phase difference of $\pi/2$ is generated in two interference light intensity signals without using any specially designed optical components and that the phase difference can be adjusted after fixing the individual optical components.

According to the present invention, there is provided a wavelength monitor comprising:

a Michelson interferometer optical system comprising;

an optical element for collimating an incident light beam from a light input section to generate a collimated light beam;

a first beam splitter for splitting the collimated light beam from the optical element into two split beams;

a first reflector and a second reflector each for reflecting the respective split beams from the first beam splitter; and an interference pattern generating means for inclining the wavefront of the reflected beam from the one of the first reflector and the second reflector, thereby to generate an interference light beam having an interference pattern in the light intensity distribution in an plane of the interference light beam;

a second beam splitter for splitting the interference light beam received from the first beam splitter in a different direction from the incident direction of the interference light beam;

a first photo-detector and a second photo-detector for receiving the respective beams of the interference light split by the second beam splitter;

a first slit provided in front of the first photo-detector;

a second slit provided in front of the second photo-detector; and a signal processor for counting intensity changes of the light beams from the first photo-detector and the second photo-detector.

According to the present invention, there is provided a wavelength monitor comprising:

a Mach-Zehnder interferometer optical system comprising:

an optical element for collimating an incident light beam from a light input section to generate a collimated light beam;

a first beam splitter for splitting the collimated light beam from the optical element into two split beams;

a first reflector and a second reflector for reflecting the respective split beams from the first beam splitter;

a second beam splitter for recombining the reflected light beams from the first reflector and the second reflector; and an interference pattern generating means for inclining the wavefront of the reflected beam from the one of the first reflector and the second reflector, thereby to generate an interference light beam having an interference pattern in the light intensity distribution in an plane of the interference light beam;

a third beam splitter for splitting the interference light beam received from the second beam splitter;

a first photo-detector and a second photo-detector for receiving the respective interference light beams split by the third beam splitter;

a first slit provided in front of the first photo-detector;

a second slit provided in front of the second photo-detector; and a signal processor for counting intensity changes of the light beams from the first photo-detector and the second photo-detector.

According to the present,invention, there is provided a wavelength monitor comprising:

a Mach-Zehnder interferometer optical system comprising:

an optical element for collimating an incident light beam from a light input section to generate a collimated light beam;

a first beam splitter for splitting the collimated light beam from the optical element into two split beams;

a first reflector and a second reflector for reflecting the respective split beams from the first beam splitter;

a second beam splitter for recombining the reflected light beams from the first reflector and the second reflector; and an interference pattern generating means for inclining the wavefront of the reflected beam from the one of the first reflector and the second reflector, thereby to generate an interference light beam having an interference pattern in the light intensity distribution in an plane of the interference light beam;

a first photo-detector for receiving the interference light beam transmitted from the second beam splitter in one of two directions;

a second photo-detector for receiving the interference light beam transmitted from the second beam splitter in the other direction thereof;

a first slit provided in front of the first photo-detector;

a second slit provided in front of the second photo-detector; and a signal processor for counting intensity changes of the light beams from the first photo-detector and the second photo-detector.

According to the present invention, there is provided a wavelength monitor comprising:

a Mach-Zehnder interferometer optical system comprising:

an optical element for collimating an incident light beam from a light input section to generate an collimated light beam;

a first beam splitter for splitting the collimated light from the optical element into two beams;

a first reflector for reflecting one of the two beams split by the first beam splitter;

a second reflector for reflecting the light beam reflected by the first reflector;

a second beam splitter for recombining the other of the two beam as split by the first beam splitter with the light beam reflected by the second reflector; and an interference pattern generating means for inclining the wavefront of the reflected beam from the one of the first reflector and the second reflector, thereby to generate an interference light beam having an interference pattern in the light intensity distribution in an plane of the interference light beam;

a third beam splitter for splitting the interference light beam received from the second beam splitter;

a first photo-detector and a second photo-detector for receiving the respective beams of the interference light split by the third beam splitter;

a first slit provided in front of the first photo-detector;

a second slit provided in front of the second photo-detector; and a signal processor for counting intensity changes of the light beams from the first photo-detector and the second photo-detector.

According to the present invention, there is provided a wavelength monitor comprising:

a Mach-Zehnder interferometer optical system comprising:

an optical element for collimating an incident light beam from a light input section to generate a collimated light bean;

a first beam splitter for splitting the collimated light beam from the optical element into two beams;

a first reflector for reflecting one of the two beams split by the first beam splitter;

a second reflector for reflecting the light beam reflected by the first reflector;

a second beam splitter for recombining the other of the two beams split by the first beam splitter with the light beam reflected by the second reflector; and an interference pattern generating means for inclining the wavefront of the reflected beam from the one of the first reflector and the second reflector, thereby to generate an interference light beam having an interference pattern in the light intensity distribution in an plane of the interference light beam;

a first photo-detector for receiving the interference light beam transmitted from the second beam splitter in one of two directions;

a second photo-detector for receiving the interference light beam transmitted from the second beam splitter in the other direction thereof;

a first slit provided in front of the first photo-detector;

a second slit provided in front of the second photo-detector; and a signal processor for counting intensity changes of the light beams from the first photo-detector and the second photo-detector.

According to the wavelength monitors of the invention, interference light intensity signals having a phase difference are produced by the means of generating an interference pattern in an interference light beam plane, so the specially designed reflector (step mirror) which has been used in the conventional wavelength monitors is no longer necessary, making it possible to realize cost reduction by parts standardization.

In addition, slits narrower than the spacing between interference fringes are positioned in front of the photo-detectors for light reception and this provides interference light intensity characteristics having almost ideal changes in light intensity.

In the wavelength monitors, the reflected light from neither of the two reflectors returns to the input section, thereby insulating it from any adverse effects.

The wavelength monitors have no need to use a third beam splitter and, hence, can be constructed at lower cost in smaller size.

If desired, said interference pattern generating means may be realized by inclining said first reflector and/or said second reflector. Alternatively, said interference pattern generating means may be realized by inserting a wedge substrate into one of the two optical paths in said optical system. Still alternatively, said interference pattern generating means may be realized by inclining said first beam splitter and/or said second beam splitter.

These designs permit adjusting the amount of inclination of the wavefronts of the two beams of reflected light that are to interfere with each other, so the wavelength band over which the wavelength monitor can operate can be set in a desired way.

In another preferred embodiment, said first slit and/or said second slit may be variable in slit width. Alternatively, said first slit and/or said second slit may be variable in slit position. Still alternatively, light reception may be effected by said first photo-detector and/or said second photo-detector which have a detecting area diameter smaller than the diameter of interference beams and said first photo-detector and/or said second photo-detector is variable in position.

By adjusting the slit position, some latitude is provided in the control of light intensity. In addition, after fixing the individual components of the wavelength monitor, the width and position of the slit provided in front of each photo-detector are adjusted to produce interference electro-optic signals having an ideal phase difference.

DETAILED DESCRIPTION OF THE PRESENT INVENTION

Wavelength monitors according to the first to fifth embodiments of the invention are described with reference to FIGS. 1–5.

First Embodiment

Figure 1:
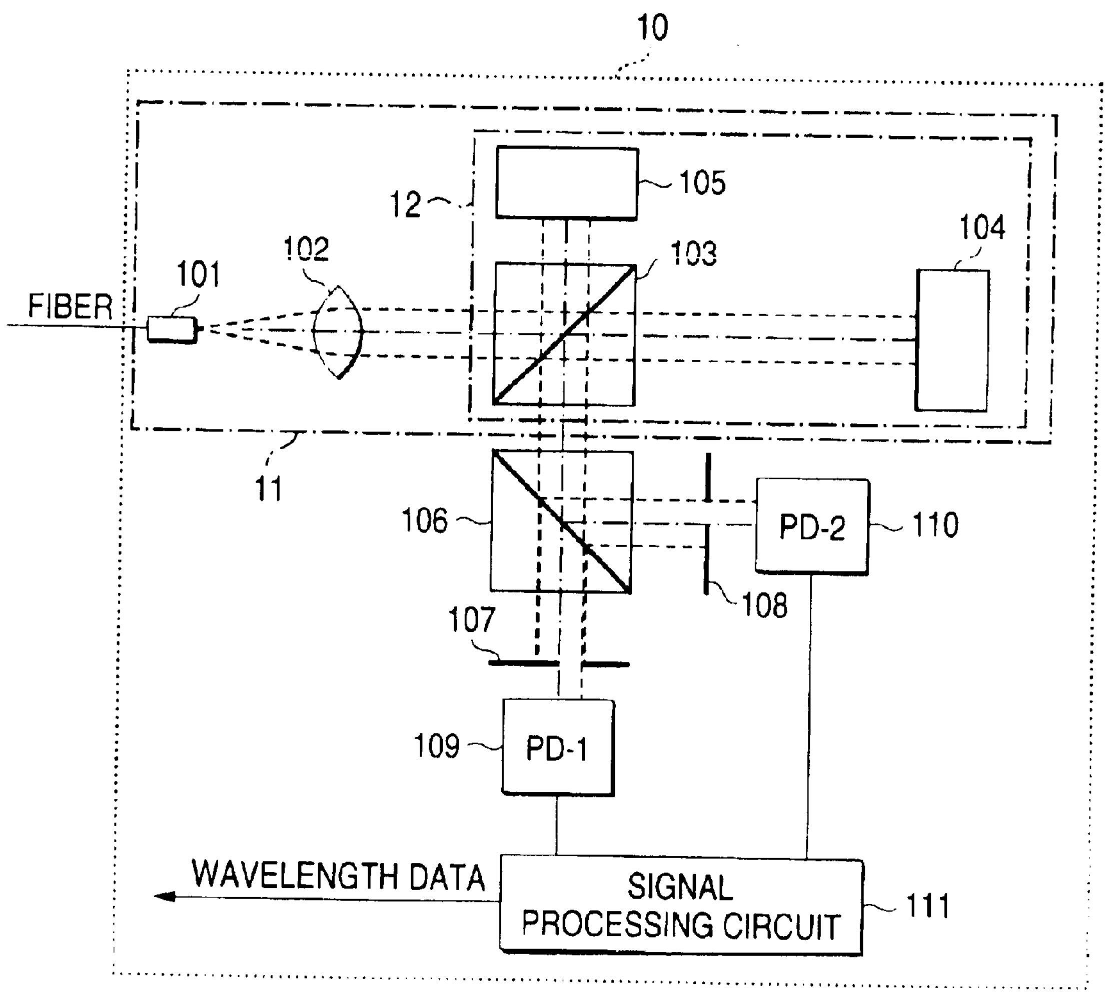
FIG. 1 is a diagram showing the configuration of a wavelength monitor according to the first embodiment of the invention.

FIG. 1 is a diagram showing configuration of a wavelength monitor 10 according to the first embodiment of the invention.

As FIG. 1 shows, the wavelength monitor 10 has a Michelson interferometer optical system 11 comprising a collimating lens (optical element) 102 for collimating the incident light from an input fiber (light input section) 101, a first beam splitter 103 for splitting the incident collimated light from the optical element 102 into two beams, and a first reflector 104 and a second reflector 105 for reflecting the respective split beams of collimated light from the first beam splitter 103.

The optical system 11 has an interference pattern generating means 12 which inclines the wavefronts of the reflected beams from the first reflector 104 and the second reflector 105 after they are recombined at the first beam splitter 103, thereby generating an interference pattern in the light intensity distribution in an interference light beam plane, and this interference pattern generating means 12 is realized by inclining the first reflector 104 and/or the second reflector 105.

The optical system 11 further includes a second beam splitter 106, a first slit 107 and a second slit 108, as well as a first photo-detector 109 and a second photo-detector 110 that are securely provided on an optical base platform (not shown); another component of the optical system 11 is a signal processing circuit (signal processing means) 111 for processing the signals from the first photo-detector 109 and the second photo-detector 110.

Next, we describe the capabilities and operations of the first embodiment on the following pages.

The input fiber 101 guides the light from a light source (not shown) and emits it from the end face. The lens 102 is provided on the optical axis of the light emerging from the input fiber 101 and collimates the light emerging from the end face of the fiber.

The emerging collimated light from the lens 102 is launched into the first beam splitter 103 provided on its optical axis. The first beam splitter 103 splits the incident light into two beams, one being directed to the first reflector 104 and the other directed to the second reflector 105.

The first reflector 104 is provided on the optical path of one of the two beams of collimated light from the first beam splitter 103 and reflects the incident beam of collimated light such that it makes a second entry into the first beam splitter 103.

The second reflector 105 is provided on the optical path of the other of the two beams of collimated light from the first beam splitter 103 and reflects the incident beam of collimated light such that it makes a second entry into the first beam splitter 103.

The two beams of collimated light reflected by the first reflector 104 and the second reflector 105 to make a second entry into the first beam splitter 103 are recombined and emerge from said first beam splitter 103 it at two end faces, one facing the input fiber 101 and the other being different from the first end face. The intensity of the light emerging from the first end face and that of the light emerging from the second end face have inverting characteristics.

The reflected beam from the first reflector 104 and the reflected beam from the second reflector 105 that are to be recombined at the first beam splitter 103 have their optical axes adjusted to incline slightly.

Adjacent the second end face of the first beam splitter 103 which is different from the first one which faces the input fiber 101, there is provided the second beam splitter 106 on the optical axis of the emerging light. The second beam splitter 106 splits the incident interference light into two beams, one being directed to the first photo-detector 109 and the other directed to the second photo-detector 110.

One of the two split beams of interference light emerging from the second beam splitter 106 is launched into the first photo-detector 109 after passing through the first slit 107 provided on its optical axis. Similarly, the other of the two split beams of interference light is launched into the second photo-detector 110 after passing through the second slit 108 provided on its optical axis.

In the system shown in FIG. 1, the collimated light is directly launched into the photo-detectors but it will be apparent to the skilled artisan that the collimated light may first be condensed with another lens (not shown) before it is received by the photo-detectors.

The first photo-detector 109 and the second photo-detector 110 may each be composed of a photodiode and after converting light to electrical signals, they output currents in accordance with the intensity of the received light.

In the signal processing circuit 111, the electrical signals proportional to the intensities of light from the first photo-detector 109 and the second photo-detector 110 are compared and subjected to necessary arithmetic operations so that the wavelength of the incident light is determined and wavelength data is output.

The system is so designed that the reflected beam from the first reflector 104 and the reflected beam from the second reflector 105 that are to be recombined at the first beam splitter 103 have their optical axes adjusted to incline (to realize the interference pattern generating means 12). As a result, the wavefronts of the two beams of reflected parallel light are inclined and the intensity of light in the interference light beam plane does not have the uniformity expressed by eq. 1; instead, linear interference fringes are generated.

If all beams of interference light having narrow interference fringes are received by the photo-detectors, a wavelength change will not cause the desired change in light intensity that is expressed by eq. 1.

In addition, the interference fringes under observation appear to make a parallel shift in response to the wavelength change.

What is more, if the inclination of the wavefronts of the two beams of reflected parallel light is increased, the spacing between interference fringes decreases; if the inclination is reduced, the spacing between interference fringes increases. If the inclination of the wavefronts eventually becomes zero (the two beams are parallel), a uniform light intensity is obtained.

However, even if interference fringes are generated in the interference light beam plane, light intensity characteristics having almost the same changes in light intensity as are expressed by eq. 1 can be obtained if a slit narrower than the spacing between interference fringes is provided in front of each photo-detector for light reception. In addition, by adjusting the position of the slit provided in front of each photo-detector, some latitude is provided in the control of light intensity.

To this end, the positions of the first slit 107 and the second slit 108 provided in front of the first photo-detector 109 and the second photo-detector 110, respectively, are adjusted, thereby making it possible to adjust the phase difference between the interference light intensity signals being output from the two photo-detectors.

According to the first embodiment of the invention, the widths and positions of the slits provided in front of the first photo-detector 109 and the second photo-detector 110 are adjusted and this has the advantage that the phase difference in the light intensity signals from the two photo-detectors as determined by fixing the individual optical elements can be controlled to produce interference light intensity signals having an ideal phase difference.

In addition, the expensive, specially designed step mirror which has been used in the conventional wavelength monitors is no longer necessary, contributing to cost reduction. The diffraction occurring at the boundary between the step and the non-step area of the step mirror is structurally absent from the design of the embodiment under consideration and there is no such problem as the occurrence of distorted interference optical signals.

Second Embodiment

Figure 2:
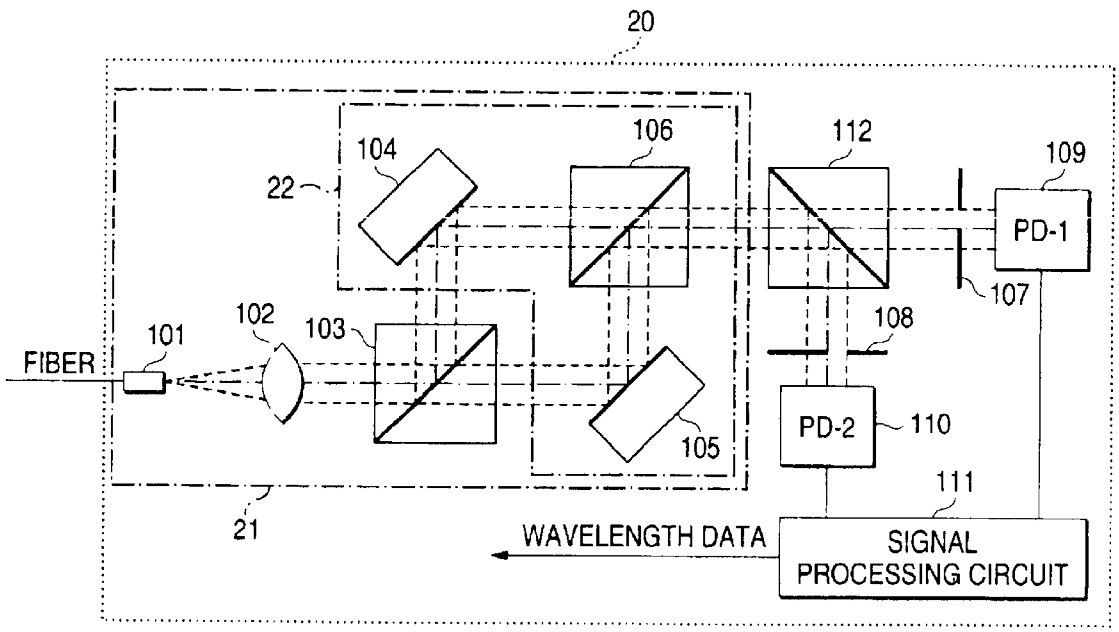
FIG. 2 is a diagram showing the configuration of a wavelength monitor according to the second embodiment of the invention.

FIG. 2 is a diagram showing the configuration of a wavelength monitor 20 according to the second embodiment of the invention. In FIG. 2, the components which are the same as those shown in FIG. 1 are identified by the same numerals.

As FIG. 2 shows, the wavelength monitor 20 of the second embodiment has a Mach-Zehnder interferometer optical system 21 comprising a collimating lens (optical element) 102 for collimating the incident light from an input fiber (light input section) 101, a first beam splitter 103 for splitting the incident collimated light from the optical element 102 into two beams, a first reflector 104 and a second reflector 105 for reflecting the respective split beams of collimated light from the first beam splitter 103, and a second beam splitter 106 for recombining the reflected beams of light.

The optical system 21 has an interference pattern generating means 22 which inclines the wavefronts of the reflected beams from the first reflector 104 and the second reflector 105 after they are recombined at the second beam splitter 106, thereby generating an interference pattern in the light intensity distribution in an interference light beam plane, and this interference pattern generating means 22 is realized either by inclining the first reflector 104 and/or the second reflector 105 or by inclining the first beam splitter 103 and/or the second beam splitter 106.

The optical system 21 further includes a third beam splitter 112, a first slit 107 and a second slit 108, as well as a first photo-detector 109 and a second photo-detector 110 that are securely provided on an optical base platform (not shown); another component of the optical system 21 is a signal processing circuit (signal processing means) 111 for processing the signals from the first photo-detector 109 and the second photo-detector 110.

Next, we describe the capabilities and operations of the second embodiment on the following pages.

The first reflector 104 is provided on the optical path of one of the two beams of collimated light from the first beam splitter 103 and reflects the incident beam of collimated light to be launched into the second beam splitter 106.

The second reflector 105 is provided on the optical path of the other of the two beams of collimated light from the first beam splitter 103 and reflects the incident beam of collimated light to be launched into the second beam splitter 106.

The two beams of collimated light reflected by the first reflector 104 and the second reflector 105 to be launched into the second beam splatter 106 are recombined and emerge from said second beam splitter 106 at two end faces that differ from the two incident end faces.

The reflected beam from the first reflector 104 and the reflected beam from the second reflector 105 that are to be recombined at the second beam splitter 106 have their optical axes adjusted to incline slightly. These two optical axes can be inclined by means of either the reflectors or the beam splitter and either method will do.

The third beam splitter 112 is provided on the optical axis of the light emerging from one of the two exit end faces of the second beam splitter 106. The light intensities emerging from the two exit end faces of the second beam splitter 106 have inverting characteristics but the third beams splitter 112 may be provided adjacent whichever of the two exit end faces. The third beam splitter 112 splits the incident interference light into two beams, one being directed to the first photo-detector 109 and the other directed to the second photo-detector 110.

One of the two split beams of interference light emerging from the third beam splitter 112 is launched into the first photo-detector 109 after passing through the first slit 107 provided on its optical axis. Similarly, the other of the two split beams of interference light is launched into the second photo-detector 110 after passing through the second slit 108 provided on its optical axis. The subsequent operations are the same as in the first embodiment.

While the second embodiment described above has the same advantage as the first embodiment, it offers another advantage in that the reflected light from neither the first reflector 104 nor the second reflector 105 returns to the input fiber 101, thereby insulating it from any adverse effects.

In addition, using an interferometer of the described design, one can fabricate a wavelength monitor having a small difference in pathlength and offering broad FSR wavelength characteristics.

Third Embodiment

Figure 3:
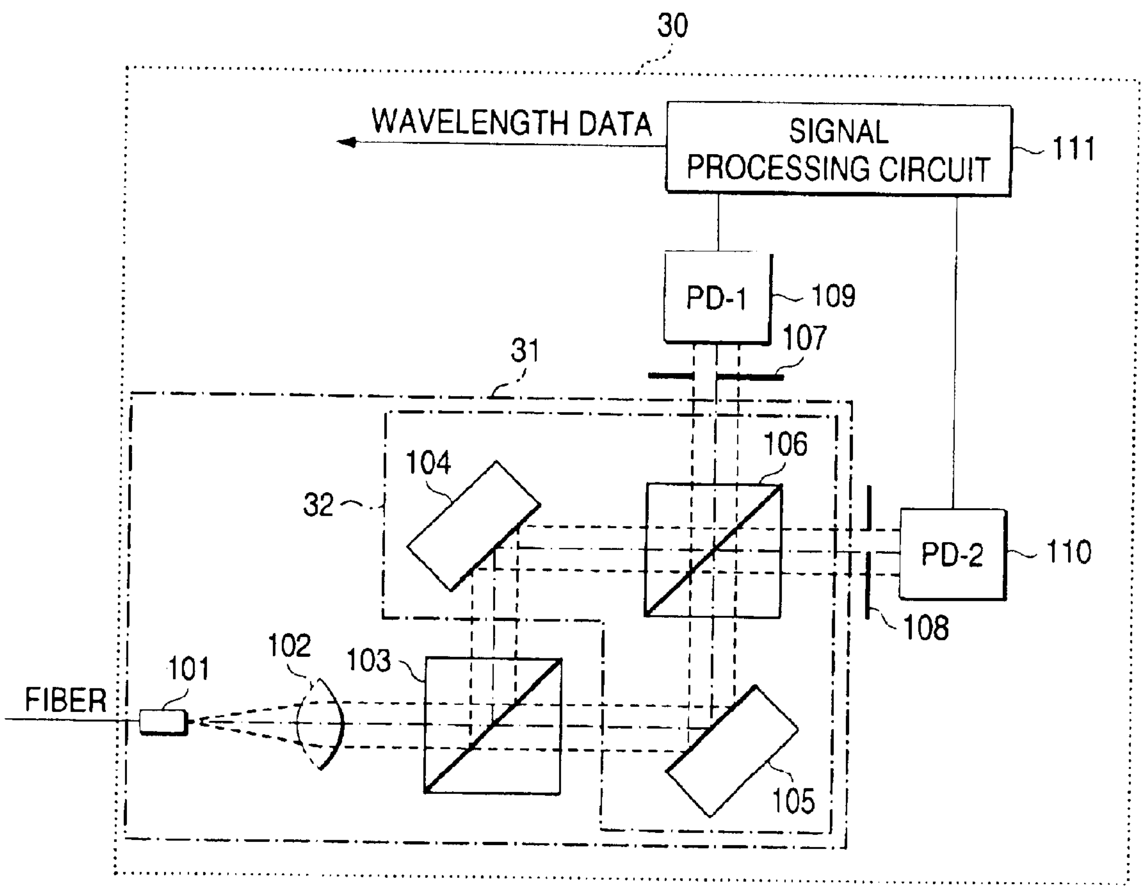
FIG. 3 is a diagram showing the configuration of a wavelength monitor according to the third embodiment of the invention.

FIG. 3 is a diagram showing the configuration of a wavelength monitor 30 according to the third embodiment of the invention. In FIG. 3, the components which are the same as those shown in FIGS. 1 and 2 are identified by the same numerals.

As FIG. 3 shows, the wavelength monitor 30 of the third embodiment has a Mach-Zehnder interferometer optical system 31 comprising a collimating lens (optical element) 102 for collimating the incident light from an input fiber (light input section) 101, a first beam splitter 103 for splitting the incident collimated light into two beams, a first reflector 104 and a second reflector 105 for reflecting the respective split beams of collimated light from the first beam splitter 103, and a second beam splitter 106 for recombining the two beams of reflected light.

The optical system 31 has an interference pattern generating means 32 which inclines the wavefronts of the reflected beams from the first reflector 104 and the second reflector 105 after they are recombined at the second beam splitter 106, thereby generating an interference pattern in the light intensity distribution in an interference light beam plane, and this interference pattern generating means 32 is realized either by inclining the first reflector 104 and/or the second reflector 105 or by inclining the first beam splitter 103 and/or the second beam splitter 106.

The optical system 31 further includes a first slit 107 and a second slit 108, as well as a first photo-detector 109 and a second photo-detector 110 that are securely provided on an optical base platform (not shown); another component of the optical system 31 is a signal processing circuit (signal processing means) 111 for processing the signals from the first photo-detector 109 and the second photo-detector 110.

Next, we describe the capabilities and operations of the third embodiment on the following pages.

The operations up to the stage of recombining the reflected beams at the second beam splitter 106 are the same as in the second embodiment.

The second beam splitter 106 recombines the two beams of reflected parallel light from the first reflector 104 and the second reflector 105 and allows them to emerge from two end faces that differ from the two incident end faces.

One of the two split beams of interference light emerging from the second beam splitter 106 is launched into the first photo-detector 109 after passing through the first slit 107 provided on its optical axis. Similarly, the other of the two split beams of interference light is launched into the second photo-detector 110 after passing through the second slit 108 provided on its optical axis. However, the light intensities emerging from the two exit end faces of the second beam splitter 106 have inverting characteristics.

The subsequent operations are the same as in the second embodiment.

It should, however, be noted that the positions of the first and second slits provided on the optical axes of the beams emerging from the second beam splitter 106 are different from their positions on the optical axes of the beams emerging from the third beam splitter 112 in the aforementioned second embodiment.

According to the third embodiment of the invention, the third beam splitter 112 in the second embodiment can be eliminated and this contributes to reducing cost and size.

Fourth Embodiment

Figure 4:
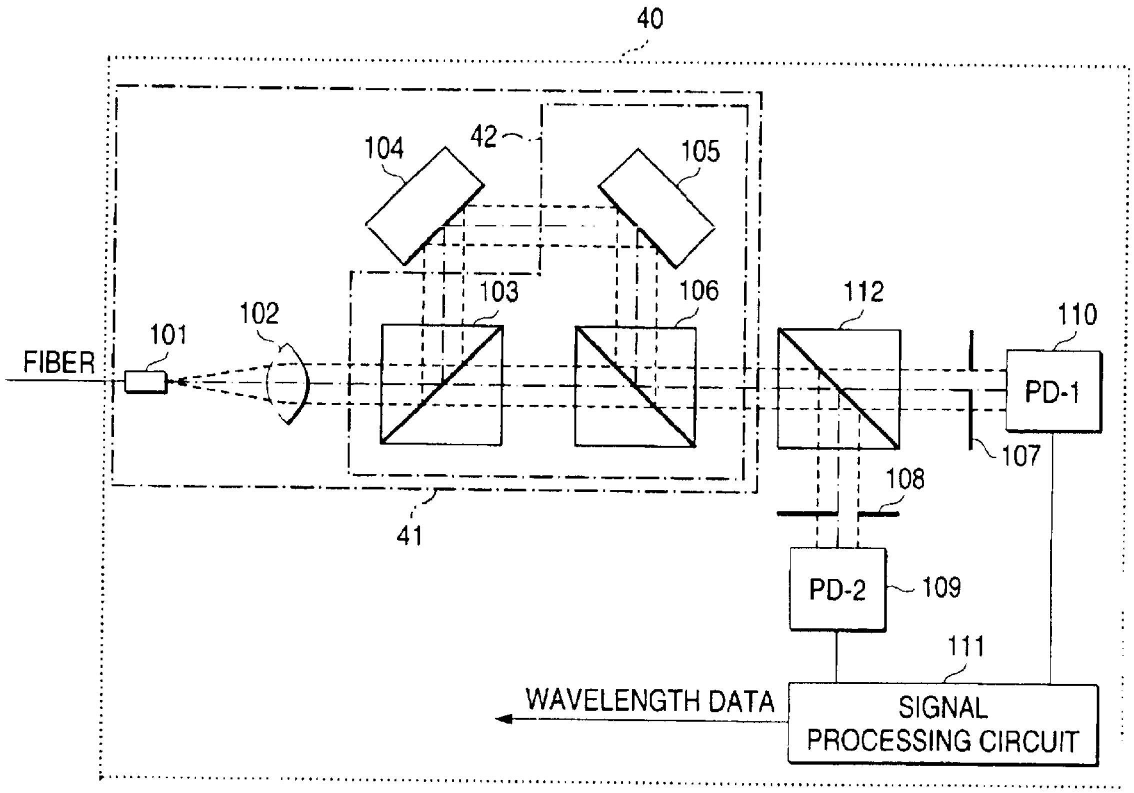
FIG. 4 is a diagram showing the configuration of a wavelength monitor according to the fourth embodiment of the invention.

FIG. 4 is a diagram showing the configuration of a wavelength monitor 40 according to the fourth embodiment of the invention. In FIG. 4, the components which are the same as those shown in FIGS. 1–3 are identified by the same numerals.

As FIG. 4 shows, the wavelength monitor 40 of the fourth embodiment has a Mach-Zehnder interferometer optical system 41 comprising a collimating lens (optical element) 102 for collimating the incident light from an input fiber (light input section) 101, a first beam splitter 103 for splitting the incident collimated light into two beams, a first reflector 104 for reflecting one of the two beams of collimated light as split by the first beam splitter 103, a second reflector 105 for reflecting the collimated light reflected from the first reflector 104, and a second beam splitter 106 for recombining the other of the two beams of collimated light as split by the first beam splitter 103 with the reflected light from the second reflector 105.

The optical system 41 has an interference pattern generating means 42 which inclines the wavefront of the reflected light from the second reflector after recombination of beams by the second beam splitter 106 and the wavefront of the other of the two beams of collimated light as split by the first beam splitter 103, thereby generating an interference pattern in the light intensity distribution in an interference light beam plane, and this interference pattern generating means 42 is realized either by inclining the first reflector 104 and/or the second reflector 105 or by inclining the first beam splitter 103 and/or the second beam splitter 106.

The optical system 41 further includes a third beam splitter 112, a first slit 107 and a second slit 108, as well as a first photo-detector 109 and a second photo-detector 110 that are securely provided on an optical base platform (not shown); another component of the optical system 41 is a signal processing circuit (signal processing means) 111 for processing the signals from the first photo-detector 109 and the second photo-detector 110.

Next, we describe the capabilities and operations of the fourth embodiment on the following pages.

The first reflector 104 is provided on the optical path of one of the two split beams of collimated light from the first beam splitter 103 and reflects the incident beam of collimated light toward the second reflector 105.

The second reflector 105 is provided on the optical path of the collimated light reflected from the first reflector 104 and reflects the incident collimated light to be launched into the second beam splitter 106.

The other of the two beams of collimated light as split by the first beam splitter 103 and the collimated light reflected from the second reflector 105 are launched into the second beam splitter 106, where they are recombined and emerge from two end faces that differ from the two incident end faces.

The third beam splitter 112 is provided on the optical axis of the light emerging from the second beam splitter 106 at one of the two exit end faces. The light intensities emerging from the two exit end faces of the second beam splitter 106 have inverting characteristics but the third beam splitter 112 may be provided adjacent whichever of the two exit end faces.

The subsequent operations are the same as in the third embodiment.

The fourth embodiment parallels the second embodiment in that the reflected light from neither the first reflector 104 nor the second reflector 105 returns to the input fiber 101, thereby insulating it from any adverse effects. On the other hand, using an interferometer of the described design, one can fabricate a wavelength monitor having a great difference in pathlength and offering narrow FSR wavelength characteristics.

Fifth Embodiment

Figure 5:
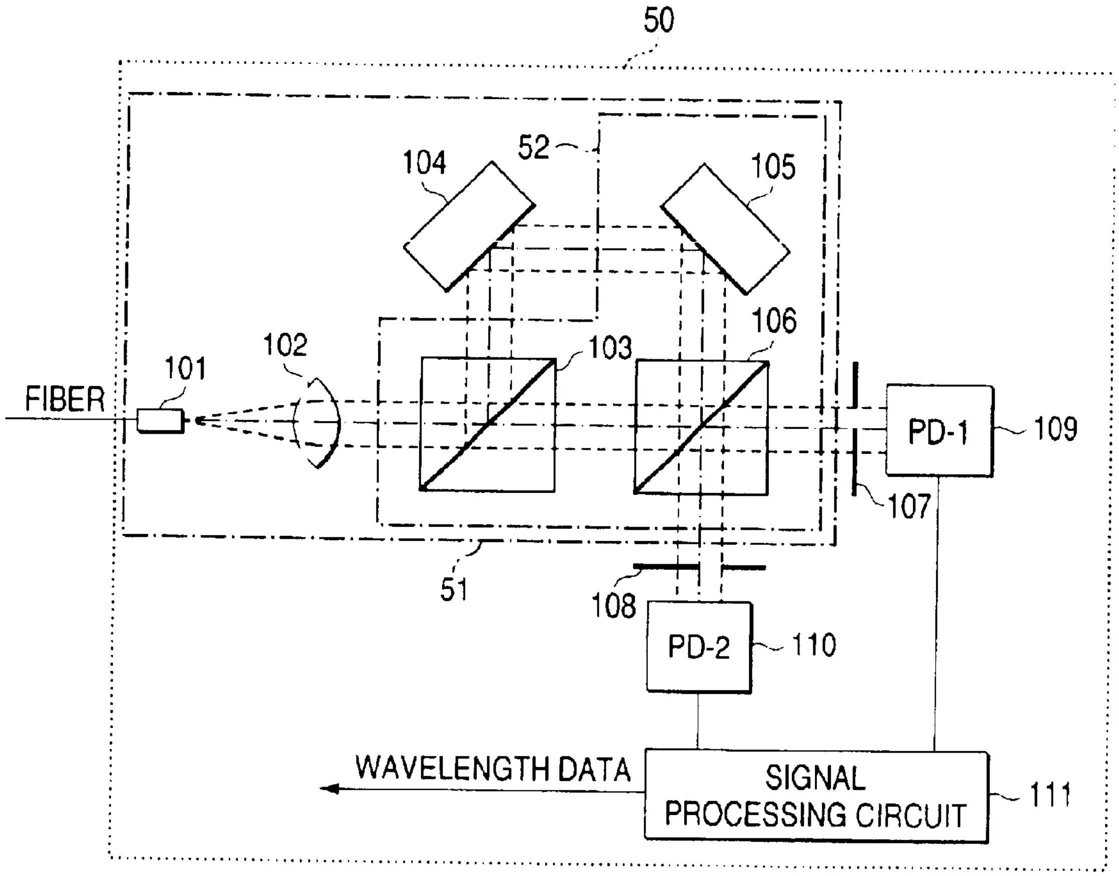
FIG. 5 is a diagram showing the configuration of a wavelength monitor according to the fifth embodiment of the invention.

FIG. 5 is a diagram showing the configuration of a wavelength monitor 50 according to the fifth embodiment of the invention. In FIG. 5, the components which are the same as those shown in FIGS. 1–4 are identified by the same numerals.

As FIG. 5 shows, the wavelength monitor 50 of the fifth embodiment has a Mach-Zehnder interferometer optical system 51 comprising a collimating lens (optical element) 102 for collimating the incident light from an input fiber (light input section) 101, a first beam splitter 103 for splitting the incident collimated light from the optical element 102 into two beams, a first reflector 104 for reflecting one of the two beams of collimated light as split by the first beam splitter 103, a second reflector 105 for reflecting the collimated light reflected from the first reflector 104, and a second beam splitter 106 for recombining the other of the two beams of collimated light as split by the first beam splitter 103 with the reflected light from the second reflector 105.

The optical system 51 has an interference pattern generating means 52 which inclines the wavefront of the reflected light from the second reflector 105 after recombination of beams by the second beam splitter 106 and the wavefront of the other of the two beams of collimated light as split by the first beam splitter 103, thereby generating an interference pattern in the light intensity distribution in an interference light beam plane, and this interference pattern generating means 52 is realized either by inclining the first reflector 104 and/or the second reflector 105 or by inclining the first beam splitter 103 and/or the second beam splitter 106.

The optical system 51 further includes a first slit 107 and a second slit 108, as well as a first photo-detector 109 and a second photo-detector 110 that are securely provided on an optical base platform (not shown); another component of the optical system 51 is a signal processing circuit (signal processing means) 111 for processing the signals from the first photo-detector 109 and the second photo-detector 110.

Next, we describe the capabilities and operations of the fifth embodiment on the following pages.

The operations up to the stage of recombining the reflected beams at the second beam splitter 106 are the same as in the fourth embodiment.

The second beam splitter 106 recombines the other of the two beams of collimated light as split by the first beam splitter 103 with the collimated light reflected from the second reflector 105. The recombined beams emerge from the second beam splitter 106 at two end faces that differ from the two incident end faces.

The subsequent operations are the same as in the aforementioned third embodiment.

According to the fifth embodiment of the invention, the third beam splitter 112 in the fourth embodiment can be eliminated and this contributes to reducing cost and size.

Figure 6:
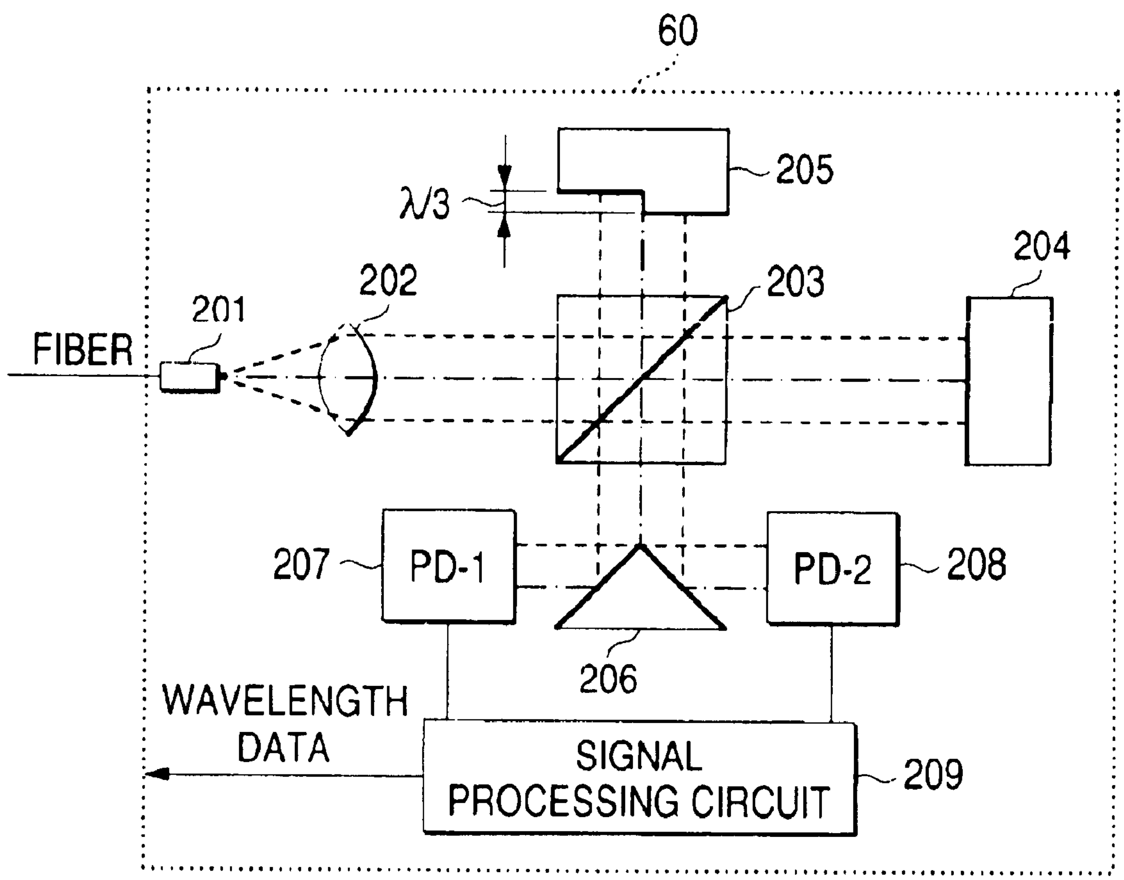
FIG. 6 is a diagram showing the configuration of a conventional wavelength monitor using a Michelson interferometer with a step mirror.

In the first to fifth embodiments described above in detail, the second beam splitter 106 in the first embodiment and the third beam splitter 112 in the second and fourth embodiments may employ the reflecting prism 206 (see FIG. 6) which is shown in JP 11-034697 A, "Wavelength Change Measuring Apparatus", and hereby incorporated as a conventional reference. Light may be reflected by the reflecting prism 206 to both sides as taught in JP 11-034697 A, supra but obviously, only one half of the beam diameter may be reflected.

The interference pattern generating means may be realized by inserting a wedge substrate (such as a glass plate in wedge shape having one side formed at an angle with the other side) into one of the optical paths in the optical system.

As detailed above, in the wavelength monitor according to the present invention, the width and position of the slit provided in front of each photo-detector are adjusted after fixing the individual components and this has the advantage of producing interference light intensity signals having an ideal phase difference.

In addition, the specially designed step mirror which has been used in the conventional wavelength monitors is no longer necessary, contributing to cost reduction. Since the diffraction occurring at the boundary between the step and the non-step area of the step mirror is absent, there is no such problem as the occurrence of distorted interference optical signals.

In the wavelength monitors, the reflected light from neither of the two reflectors returns to the input fiber, thereby insulating the input section from any adverse effects.

The wavelength monitors use a smaller number of components and, hence, can be constructed at lower cost in smaller size.

What is claimed is:

1. A wavelength monitor comprising:

a Michelson interferometer optical system comprising:
 an optical element for collimating an incident light beam from a light input section to generate a collimated light beam;
 a first beam splitter for splitting the collimated light beam from the optical element into two split beams;
 a first reflector and a second reflector each for reflecting the respective split beams from the first beam splitter; and
 an interference pattern generating means for inclining the wavefront of the reflected beam from at least one of the first reflector and the second reflector to generate an interference light beam having an interference pattern in the light intensity distribution in a plane of the interference light beam, wherein the wavefronts of the beams that are combined to generate the interference pattern have optical axes inclined with respect to one another;

a second beam splitter for splitting the interference light beam received from the first beam splitter in a different direction from the incident direction of the interference light beam;

a first photo-detector and a second photo-detector for receiving the respective beams of the interference light split by the second beam splitter;

a first slit provided in front of the first photo-detector;

a second slit provided in front of the second photo-detector; and a signal processor for counting intensity changes of the light beams based on signals from the first photo-detector and the second photo-detector wherein the first slit and the second slit are positioned to adjust a phase difference of signals from the first photo-detector and the second photo-detector.

2. The wavelength monitor according to claim 1, wherein the interference pattern generating means is realized by inclining the first reflector and/or the second reflector.

3. The wavelength monitor according to claim 1, wherein the interference pattern generating means is realized by inserting a wedge substrate into one of the two optical paths in the optical system.

4. The wavelength monitor according to claim 1, wherein the first slit and/or the second slit is variable in slit width.

5. The wavelength monitor according to claim 1, wherein the first slit and/or the second slit is variable in slit position.

6. The wavelength monitor according to claim 1, wherein light reception is effected by the first photo-detector and/or the second photo-detector which have a detecting area diameter smaller than the diameter of interference beams; and wherein the first photo-detector and/or the second photo-detector is variable in position.

7. A wavelength monitor comprising:

a Mach-Zehnder interferometer optical system comprising:
 an optical element for collimating an incident light beam from a light input section to generate a collimated light beam;
 a first beam splitter for splitting the collimated light beam from the optical element into two split beams;
 a first reflector and a second reflector each for reflecting the respective split beams from the first beam splitter; and
 a second beam splitter for recombining the reflected light beams from the first reflector and the second reflector; and
 an interference pattern generating means for inclining the wavefront of the reflected beam from at least one of the first reflector and the second reflector to generate an interference light beam having an interference pattern in the light intensity distribution in a plane of the interference light beam, wherein the wavefronts of the beams that are combined to generate the interference pattern have optical axes inclined with respect to one another;

a third beam splitter for splitting the interference light beam received from the second beam splitter;

a first photo-detector and a second photo-detector for receiving the respective beams of the interference light beams split by the third beam splitter;

a first slit provided in front of the first photo-detector;

a second slit provided in front of the second photo-detector; and a signal processor for counting intensity changes of the light beams based on signals from the first photo-detector and the second photo-detector wherein the first slit and the second slit are positioned to adjust a phase difference of signals from the first photo-detector and the second photo-detector.

8. The wavelength monitor according to claim 7, wherein the interference pattern generating means is realized by inclining the first reflector and/or the second reflector.

9. The wavelength monitor according to claim 7, wherein the interference pattern generating means is realized by inserting a wedge substrate into one of the two optical paths in the optical system.

10. The wavelength monitor according to claim 7, wherein the interference pattern generating means is realized by inclining the first beam splitter and/or the second beam splitter.

11. The wavelength monitor according to claim 7, wherein the first slit and/or the second slit is variable in slit width.

12. The wavelength monitor according to claim 7, wherein the first slit and/or the second slit is variable in slit position.

13. The wavelength monitor according to claim 7, wherein the light reception is effected by the first photo-detector and/or the second photo-detector which have a detecting are diameter smaller than the diameter of interference beams; and wherein the first photo-detector and/or the second photo-detector is variable in position.

14. A wavelength monitor comprising:

a Mach-Zehnder interferometer optical system comprising:

an optical element for collimating an incident light beam from a light input section to generate a collimated light beam;

a first beam splitter for splitting the collimated light beam from the optical element into two split beams;

a first reflector and a second reflector each for reflecting the respective split beams from the first beam splitter; and a second beam splitter for recombining the reflected light beams from the first reflector and the second reflector; and an interference pattern generating means for inclining the wavefront of the reflected beam from at least one of the first reflector and the second reflector to generate an interference light beam having an interference pattern in the light intensity distribution in a plane of the interference light beam, wherein the wavefronts of the beams that are combined to generate the interference pattern have optical axes inclined with respect to one another;

a first photo-detector for receiving the interference light beam transmitted from the second beam splitter in one of two directions;

a second photo-detector for receiving the interference light beam transmitted from the second beam splitter in the other direction thereof;

a first slit provided in front of the first photo-detector;

a second slit provided in front of the second photo-detector; and a signal processor for counting intensity changes of the light beams based on signals from the first photo-detector and the second photo-detector wherein the first slit and the second slit are positioned to adjust a phase difference of signals from the first photo-detector and the second photo-detector.

15. The wavelength monitor according to claim 14, wherein the interference pattern generating means is realized by inclining the first reflector and/or the second reflector.

16. The wavelength monitor according to claim 14, wherein the interference pattern generating means is realized by inserting a wedge substrate into one of the two optical paths in the optical system.

17. The wavelength monitor according to claim 14, wherein the interference pattern generating means is realized by inclining the first beam splitter and/or the second beam splitter.

18. The wavelength monitor according to claim 14, wherein the first slit and/or the second slit is variable in slit width.

19. The wavelength monitor according to claim 14, wherein the first slit and/or the second slit is variable in slit position.

20. The wavelength monitor according to claim 14, wherein light reception is effected by the first photo-detector and/or the second photo-detector which have a detecting area diameter smaller than the diameter of interference beams; and wherein the first photo-detector and/or the second photo-detector is variable in position.

21. A wavelength monitor comprising:

a Mach-Zehnder interferometer optical system comprising:

an optical element for collimating an incident light beam from a light input section to generate a collimated light beam;

a first beam splitter for splitting the collimated light beam from the optical element into two beams;

a first reflector for reflecting one of the two beams split by the first beam splitter;

a second reflector for reflecting the light beam reflected by the first reflector;

a second beam splitter for recombining the other of the two beams split by the first beam splitter with the light beam reflected by the second reflector; and an interference pattern generating means for inclining the wavefront of the reflected beam from at least one of the first reflector and the second reflector to generate an interference light beam having an interference pattern in the light intensity distribution in a plane of the interference light beam, wherein the wavefronts of the beams that are combined to generate the interference pattern have optical axes inclined with respect to one another;

a third beam splitter for splitting the interference light beam received from the second beam splitter;

a first photo-detector and a second photo-detector for receiving the respective beams of the interference light split by the third beam splitter;

a first slit provided in front of the first photo-detector;

a second slit provided in front of the second photo-detector; and a signal processor for counting intensity changes of the light beams based on signals from the first photo-detector and the second photo-detector wherein the first slit and the second slit are positioned to adjust a phase difference of signals from the first photo-detector and the second photo-detector.

22. The wavelength monitor according to claim 21, wherein the interference pattern generating means is realized by inclining the first reflector and/or the second reflector.

23. The wavelength monitor according to claim 21, wherein the interference pattern generating means is realized by inserting a wedge substrate into one of the two optical paths in the optical system.

24. The wavelength monitor according to claim 21, wherein the interference pattern generating means is realized by inclining the first beam splitter and/or the second beam splitter.

25. The wavelength monitor according to claim 21, wherein the first slit and/or the second slit is variable in slit width.

26. The wavelength monitor according to claim 21, wherein the first slit and/or the second slit is variable in slit position.

27. The wavelength monitor according to claim 21, wherein light reception is effected by the first photo-detector and/or the second photo-detector which have a detecting area diameter smaller than the diameter of interference beams; and wherein the first photo-detector and/or the second photo-detector is variable in position.

28. A wavelength monitor comprising:

a Mach-Zehnder interferometer optical system comprising:

an optical element for collimating an incident light beam from a light input section to generate a collimated light beam;

a first beam splitter for splitting the collimated light beam from the optical element into two beams;

a first reflector for reflecting one of the two beams split by the first beam splitter;

a second reflector for reflecting the light beam reflected by the first reflector;

a second beam splitter for recombining the other of the two beams split by the first beam splitter with the light beam reflected by the second reflector; and an interference pattern generating means for inclining the wavefront of the reflected beam from at least one of the first reflector and the second reflector to generate an interference light beam having an interference pattern in the light intensity distribution in a plane of the interference light beam, wherein the wavefronts of the beams that are combined to generate the interference pattern have optical axes inclined with respect to one another;

a first photo-detector for receiving the interference light beam transmitted from the second beam splitter in one of two directions;

a second photo-detector for receiving the interference light beam transmitted from the second beam splitter in the other direction thereof;

a first slit provided in front of the first photo-detector;

a second slit provided in front of the second photo-detector; and a signal processor for counting intensity changes of the light beams based on signals from the first photo-detector and the second photo-detector wherein the first slit and the second slit are positioned to adjust a phase difference of signals from the first photo-detector and the second photo-detector.

29. The wavelength monitor according to claim 28, wherein the interference pattern generating means is realized by inclining the first reflector and/or the second reflector.

30. The wavelength monitor according to claim 28, wherein the interference pattern generating means is realized by inserting a wedge substrate into one of the two optical paths in the optical system.

31. The wavelength monitor according to claim 28, wherein the interference pattern generating means is realized by inclining the first beam splitter and/or the second beam splitter.

32. The wavelength monitor according to claim 28, wherein the first slit and/or the second slit is variable in slit width.

33. The wavelength monitor according to claim 28, wherein the first slit and/or the second slit is variable in slit position.

34. The wavelength monitor according to claim 28, wherein light reception is effected by the first photo-detector and/or the second photo-detector which have a detecting area diameter smaller than the diameter of interference beams; and wherein the first photo-detector and/or the second photo-detector is variable in position.

* * * * *